United States Patent [19]

Richardson

[11] 4,134,068
[45] Jan. 9, 1979

[54] TRANSMITTER/RECEIVERS

[75] Inventor: Christopher K. Richardson, Romsey, England

[73] Assignee: Plessey Handel und Investments AG, Zug, Switzerland

[21] Appl. No.: 777,661

[22] Filed: Mar. 15, 1977

[30] Foreign Application Priority Data

Mar. 16, 1976 [GB] United Kingdom ............... 10360/76
Oct. 9, 1976 [GB] United Kingdom ............... 42065/76

[51] Int. Cl.² .......................... H04B 7/16; H04B 1/54
[52] U.S. Cl. ........................................... 325/7; 325/8; 325/20; 343/181
[58] Field of Search ..................... 325/7, 9, 11, 13, 19, 325/20, 8, 49, 50, 329, 330; 343/180, 181

[56] References Cited

U.S. PATENT DOCUMENTS

| 2,747,083 | 5/1956 | Guanella | 325/7 |
| 2,863,042 | 12/1958 | Sanders, Jr. et al. | 325/20 |
| 3,825,830 | 7/1974 | O'Conner | 325/20 |
| 3,916,412 | 10/1975 | Amoroso, Jr. | 325/20 X |
| 4,048,566 | 9/1977 | Carson et al. | 325/329 |

Primary Examiner—Benedict V. Safourek
Attorney, Agent, or Firm—Fleit & Jacobson

[57] ABSTRACT

A transmitter/receiver adapted for contemporaneous operation in the transmit and receive mode utilizing a single carrier frequency whereby single frequency duplex operation is achieved.

17 Claims, 4 Drawing Figures

TRANSMITTER/RECEIVERS

This invention relates to transmitter/receivers.

Known transmitter/receivers operate either in a simplex mode or in a duplex mode. Simplex operation utilises one frequency both for transmission and reception, a switch key being provided to facilitate the selection of either the transmit function or the receive function. Duplex operation on the other hand requires the use of two carrier frequencies, one for transmission and one for reception with the advantage that contemporaneous transmission and reception is possible and therefore a function selection switch key as needed for simplex operation is not required, but with the disadvantage that twice as much band space is required since separate frequencies are needed for transmission and reception.

It is an object of the present invention to provide a transmitter/receiver utilising the same carrier frequency for transmission and reception wherein contemporaneous transmission and reception is facilitated. Such a system may be referred to as single frequency duplex SFD or alternatively and perhaps more aptly as CCD common channel duplex.

According to the present invention a common channel duplex transmitter/receiver comprises a signal generator or oscillator means which is adapted to receive a modulating signal and which provides a carrier frequency for transmission, and mixer means to which received are fed and which is fed also from said signal generator or oscillator means to facilitate demodulation of received signals.

The mixer means may provide two output signals in phase quadrature which are fed to demodulator means via low pass filter means.

According to one aspect of the invention the oscillator means is adapted and arranged to be angle modulated with data to be transmitted, the transmitter/receiver comprising transmission output terminal means fed from the oscillator means, receiver input terminal means, signals from which are fed to a pair of mixers fed also from the oscillator means, a phase quadrature device via which at least one mixer is fed with the received input signal such that the signals fed to the mixers from the receiver input terminal are in phase quadrature, and a pair of low pass filters constituting the filter means and fed one from each mixer, the demodulator means being responsive to signals fed from the low pass filters for providing an output signal corresponding to data received.

According to an alternative aspect of the invention the oscillator means is adapted and arranged to be angle modulated with data to be transmitted, the transmitter/receiver comprising transmission output terminal means fed from the oscillator means, receiver input terminal means, signals from which are fed to a pair of mixers fed also from the oscillator, a phase quadrature device via which at least one mixer is fed from the oscillator means such that the signals fed to the mixers from the oscillator means are in phase quadrature, and a pair of low pass filters constituting the filter means and fed one from each mixer, the demodulator means being responsive to signals fed from the low pass filters for providing an output signal corresponding to data received.

The term 'angle modulation' as used herein is intended to include any form of modulation wherein the phase angle is changed in accordance with the modulating signal and includes frequency or phase modulation.

In a transmitter/receiver according to the said one aspect of the invention or according to the said alternative aspect of the invention, the transmission output terminal means and the receiver input terminal means may be connected to a non-reciprocal junction device the other terminal of which is connected to an aerial suitable for transmission and reception purposes, and the oscillator means may afford a signal which is angle modulated at substantially constant amplitude.

A non-reciprocal junction device when referred to herein is defined as any device having three terminals A, B, C wherein the impedance presented by the device to radio signals transmitted from terminal A to terminal B or from terminal C to terminal A is low compared with the impedance presented by the device to radio signals transmitted from terminal C to terminal B. Such devices are available as proprietary items utilising integrated circuit technology or they may comprise certain types of known coupler device.

The non-reciprocal junction device may be connected to the aerial via an aerial tuner unit.

Although in most circumstances the non-reciprocal junction device provides adequate isolation in that it satisfactorily isolates the demodulator means from modulated signals fed from the oscillator means to the transmission aerial terminal, there may occur, due to a mismatch between an aerial and the non-reciprocal junction device for example, reflected signals fed back into the non-reciprocal junction device which are fed to the demodulator means and which may cause damage if the level of such signals is not limited in some way.

In order therefore to limit such undesirable feedback signals to a safe level, there may be provided a detector responsive to the signals fed to the demodulator for providing a feedback signal utilised to control the gain of the power amplifier via which modulated signals from the oscillator means are fed to the non-reciprocal junction device.

Alternatively in a transmitter/receiver according to the said one aspect of the invention or according to the said alternative aspect of the invention, the transmission output terminal means and the receiving input terminal means may be connected to separate aerials one for transmission and one for reception.

The oscillator means may be fed to the transmission output terminal means via a power amplifier.

According to a further aspect of the invention, the mixer means may comprise two parts one of which is a phase quadrature splitter such as a 90° hybrid coupler and the other of which is a signal splitter means connected so that its two outputs combine with the quadrature related outputs of the 90° hybrid coupler, one part being fed with the received input signal and the other part being fed with signal from the oscillator, and a pair of non-linear mixing devices via which the two combined outputs are fed to the demodulator means.

The non-linear elements may comprise a pair of diodes arranged to feed the demodulator means via the low pass filter means.

The output of the oscillator means may be fed via an amplifier arrangement to provide the carrier frequency for transmission and the signal for the mixer means, the amplifier arrangement being stabilised by means of a feedback control loop.

The amplifier arrangement may comprise a power amplifier fed from the oscillator means via a controlled attenuator, and a rectifier via which a signal from the output of the power amplifier is fed to a comparator which is fed also with a reference signal so as to provide a feedback control signal for the attenuator, whereby the amplitude of the signal fed to the power amplifier is controlled so that any difference between the amplitude of the signals fed to the comparator is nullified.

An aerial for transmission and reception may be arranged to feed the 90° hybrid coupler, signals from the oscillator means being fed to the signal splitter means.

Alternatively, an aerial for transmission and reception may be arranged to feed the splitter, the 90° hybrid coupler being fed from the oscillator means.

The splitter means may comprise a centre tapped winding providing two in phase outputs.

Signals from the oscillator means may be fed to the centre tap of the winding via a ¼ λ line wherein λ is the wavelength of the oscillator frequency approximately.

The outputs from the diodes may be fed to the low pass filter means each via a subtraction circuit fed also with a rectified signal from the oscillator means whereby amplitude variations originating from the oscillator means or amplifiers associated therewith are cancelled.

The demodulator means may be chosen in accordance with the kind of modulation received and for F.M. modulation may for example be as shown in FIG. 2 of our G.B. Pat. No. 1,172,977 or alternatively as shown in FIG. 2 of our G.B. Pat. No. 1,172,975, or alternatively it may comprise a Barber discriminator.

In a transmitter/receiver according to the present invention wherein direct conversion of an incoming signal is effected (that is to say a received modulated carrier frequency is mixed with a local oscillator frequency which is at the same frequency as the carrier or very close to the frequency of the received carrier) the difference frequency components produced include the wanted frequency which is referenced to zero frequency and in the case of frequency modulation folded about zero frequency.

The demodulator means must therefore be capable of demodulating such a signal and various demodulators such as those just before mentioned which require phase quadrature related input signals may be utilised, but it is also possible to demodulate such a signal with a demodulator requiring one input signal only.

In one application of the invention the incoming data received may be utilised to modulate the local oscillator for re-transmission thereby providing a radio relay station.

An exemplary embodiment of the invention will now be described with reference to the accompanying drawings in which.

Figure 1:
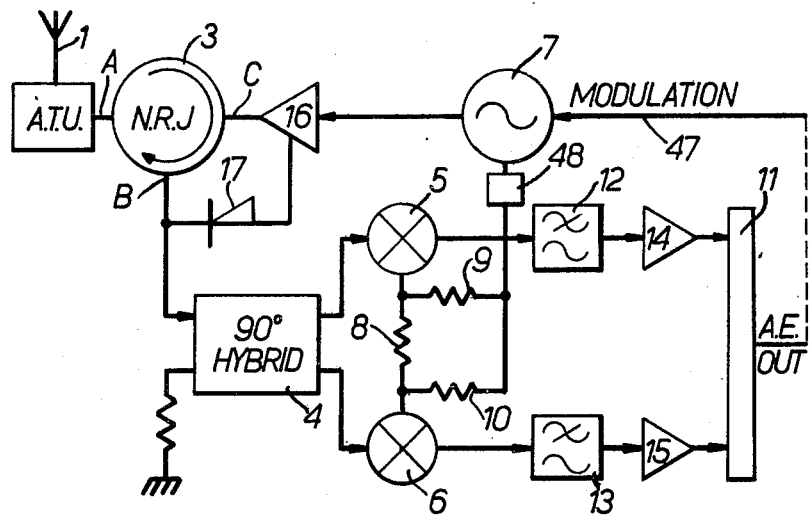
FIG. 1 is a block schematic diagram of a transmitter/receiver.

Referring now to FIG. 1, a signal is received by an aerial 1 and fed via an aerial tuner unit (ATU) 2 and a non-reciprocal junction device (NJR) 3 to a 90° hybrid coupler 4. The hybrid coupler 4 splits the signal into two equal amplitude signals with a 90 phase difference between them. These signals are then fed to a pair of similar diode quadrature mixers 5 and 6. The mixers 5 and 6 are switched by a local oscillator 7 at a frequency which is on or close to the nominal carrier frequency of the received signals, the local oscillator being arranged to feed the mixers 5 and 6 via a pad comprising resistors 8, 9 and 10.

The output signals from each of the mixers 5, 6 consists of the beat frequency between the local oscillator and the instantaneous frequency of the received signal. These outputs from the mixers 5 and 6 have always a 90° phase difference between them but one output switches 180° in phase relative to the other when the received signal frequency sweeps through zero beat with the local oscillator frequency. The information required to recover the original modulation is therefore present at the output of the mixers 5, 6 in the form of the instantaneous beat frequency and the relative phase difference between the outputs.

The audio modulation is recovered in an F.M. detector 11 and the receiver selectivity is determined by low pass filters 12 and 13. All or most of the amplification is carried out at low frequency in the amplifiers 14 and 15.

The type of VF.M. detector 11 used is not original and a full description of such a detector is published in the specifications accompanying our G.B. Pat. Nos. 1,172,977 and 1,172,975.

The local oscillator 7 is used to drive both receiver and transmitter, the output of the local oscillator being amplified to a level of say 10 watts by amplifier 16 and being fed to the aerial 1 via the non-reciprocal junction device 3 and aerial tuner unit 2.

For single frequency duplex operation, two main criteria must be met.

(i) The transmitter output power must not get into the receiver at a high enough level to damage or desensitize it.

(ii) The transmitted signal must not interfere with the received signal although they are on the same frequency at the same time.

This second requirement cannot be met by conventional super-heterodyne systems in which a receiver and transmitter are operated contemporaneously at the same frequency because the transmitted frequency carrier would swamp the received signal. However in the present system, since the transmitted signal is also the receiver local oscillator, it is effectively cancelled as will hereinafter be explained. Isolation between the transmitter output and the receiver input is achieved by the use of the non-reciprocal junction device 3. Provided that port A of the NRJ device 3 'sees' a well matched load, power present at port C will be transferred at low loss to port A. Likewise a signal received at port A is transferred to port B at low loss whereas very little power is fed from port C to port B. For instance, if the power output from the transmitter is 10w and the NRJ device 3 has an isolation of 40dB, then the power presented to the receiver is 1mw. This will not saturate the average diode quad mixer.

However in order to protect the mixer when fault conditions obtain, the power presented to the receiver is detected by diode 17 and used to control the gain of amplifier 16 so as to limit the output power of the transmitter. Therefore, if the match to the aerial is poor and the isolation provided by the NRJ device 3 is too low, the transmitter power is automatically turned down to prevent damage to the receiver. The power output from the transmitter is therefore a function of how well the ATU 2 is adjusted. Mutual interference between transmitter and receiver is avoided by the use of direct conversion receiving techniques.

Consider the operation of one of the mixers 5, 6 when no input signal is being received. The instantaneous output of the mixers 5, 6 consists of the sum and difference frequency between the receiver local oscillator 7 and the received signal which is due only to the transmitter output. The received signal due to the transmitter output is on the same frequency as the receiver local oscillator 7 even when the oscillator 7 is frequency modulated for transmission purposes, since they are both derived from the same source. The sum frequency is removed by the low pass filters 12, 13 and the difference frequency is zero. The output of the low pass filters 12, 13 due to a signal from the transmitter is therefore at zero freqency (i.e. a D.C. level which can be removed by A.C. coupling) regardless of how much F.M. is present on the local oscillator 7.

The main amplification is carried out after the low pass filters 12, 13 and the a.c. coupling, thus no signal is presented to the receiver amplifiers due to the local transmitter. Modulation is detected in the receiver by variation in the difference frequency between the received signal and the local oscillator. The output of the detector 11 therefore consists of the addition of the modulation present on both the received signal and the local oscillator (i.e. the local modulation when present, appears as sidetone in the receiver output when a signal is being received).

Although the arrangement thus far described operates generally satisfactorily, the rejection of the frequency modulated unwanted transmitted signal in the receiver can be impaired by the effect of transmission delay in the RF signal path between transmitter and receiver. One method of minimising this effect is to include a compensating delay device 48 in the local oscillator path as shown.

The system will behave as a single frequency radio relay if part of the output of the detector 11 is fed back into the transmitter via line 47 as modulation and negative feedback. The local oscillator 7 frequency tends to follow the modulation present on a received signal. The output of the demodulator is therefore the error signal.

The system just before described enables full duplex operation to be achieved between two radio telephones using a similar carrier frequency. The local oscillators driving the radio telephones do not need to be phase locked to one another and small frequency differences between the two oscillators are unimportant. The system can also be used as a single frequency radio relay.

The transmitter may use any form of constant amplitude modulation. The receiver may be arranged to detect amplitude or angle modulation independent of the transmitter modulation. Note that if F.M. is used both for the transmit and receive modulation, then the deviation of the transmitted signal may be greater or less than the deviation used by the received signal.

The cancellation of the transmitted frequency within the receiver will fail when the level of signal coupled from the transmitter into the receiver becomes sufficient to cause the latter to operate in a non-linear manner. Consequently it is important that sufficient isolation is provided between transmitter and receiver systems for high transmitter power levels. This may be achieved by the circuit configuration shown in FIG. 1 utilising an NRJ device, or alternatively by the use of separate antennae or any similar means of improving isolation by the use of directional antennae structures.

As an alternative to the embodiment described with reference to FIG. 1, an embodiment as described with reference to FIG. 2 or FIG. 3 may be used which does not require an NRJ device.

Figure 2:
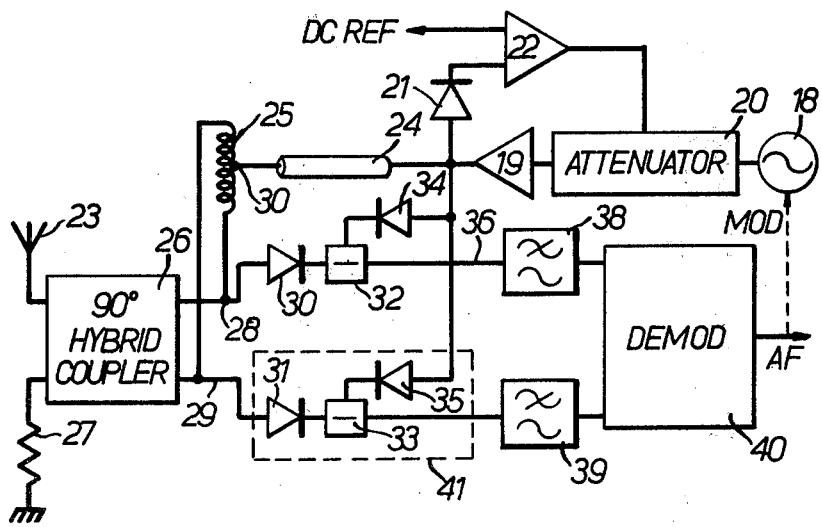
FIG. 2 is a block schematic diagram of an alternative form of transmitter/receiver.

Referring now to FIG. 2 and considering operation for transmission of signals, an oscillator 18 capable of being frequency modulated or otherwise angle modulated is fed to a power amplifier 19 via a voltage variable attenuator 20. The output waveform of the power amplifier 19 is rectified by diode 21 and compared with a DC reference level in comparator 22 the output of which feeds the attenuator 20 to define a feedback loop. The attenuator 20 controls the input power to the power amplifier 19 in order to maintain the rectified output voltage from the diode 21 at the reference level. The circuit thus far described operates to reduce the AM noise normally present at the output of a transmitter, due to power supply variation, and amplifier noise, etc. and provides a low impedance at the output of power amplifier 19.

The output from power amplifier 19 is fed to an aerial 23 via a $\frac{1}{4}$ λ coaxial line 24, and in-phase hybrid coil 25, and a 90° hybrid coupler 26. A small amount of power is dissipated in a dump load 27 of the 90° hybrid coupler 26 due to the fact that the two input signals fed to the coupler 26 from the coil 25 are in-phase signals, quadrature signals being required for maximum transfer of power.

Considering now the operation of the arrangement of FIG. 2 for received signals, a received signal (with a similar frequency to the transmitted signal) is split into two similar but quadrature phased outputs by the 90° hybrid coupler 26. These signals are present at the 0 and 90° ports 28, 29 of the coupler 26 together with the in-phase signals from the transmitter. At each of the ports 28, 29 the signals present beat together to produce a carrier signal, amplitude modulated at the instantaneous difference frequency between the transmitted and received signals. The modulation envelope of the two signals has a 90° phase relationship.

Due to the action of the feedback loop, the output impedance of the power amplifier 19 is low to signals presented to it from the $\frac{1}{4}$ λ coaxial line 24. The $\frac{1}{4}$ λ coaxial line acts as a transformer and transforms this low impedance to a high impedance at the centre tap 30 of the in-phase hybrid coil 25. Excessive coupling between the 0 and 90° ports 28, 29 of the 90° hybrid coupler is thus prevented because the coil behaves like an RF choke when the centre tap 30 is not loaded.

The signals at the output ports 28, 29 of the 90° hybrid coupler 26 are rectified by diodes 30, 31 in order to recover the difference frequency envelopes. The modulation envelopes also contain remnants of AM noise from the transmitter. This noise is removed by subtracting in subtraction circuit 32, 33, a rectified version of the power amplifier output, rectification being effected by diodes 34, 35. The wanted signals are unaffected because the received signal is not present at the output of the power amplifier 19 due to the action of the levelling loop which ensures that the impedance at the output of the power amplifier 19 is low to amplitude variation due to the beat frequency.

Signals on lines 36 and 37 at the output of the subtraction circuits 32, 33 may be processed as hereinbefore described with reference to FIG. 1 by low pass filters 38, 39 which feed a demodulator 40 corresponding to the demodulator described with reference to FIG. 2 of our G.B. Pat. No. 1,172,977 or with reference to FIG. 2 of our G.B. Pat. No. 1,172,975, or alternatively it may comprise a Barber discriminator.

However, because amplitude modulation on the power amplifier 19 is subtracted from the audio outputs, amplitude modulated single frequency duplex operation is possible with this system and the demodulator 40 would be chosen accordingly.

Figure 3:
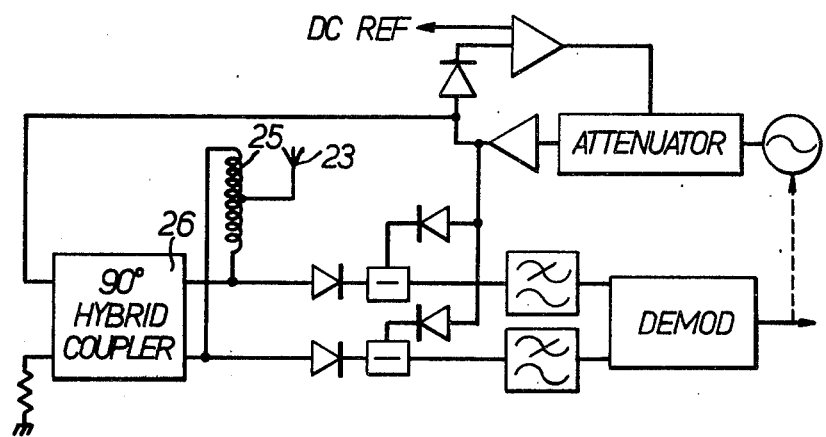
FIG. 3 is a block schematic diagram of a modified form of transmitter/receiver shown in FIG. 2.

An alternative arrangement as shown in FIG. 3 may be used wherein the 90° hybrid coupler 26 and the hybrid coil 25 are interchanged. The operation of the circuit is very similar to the circuit described with reference to FIG. 2, but since the aerial 23 impedance is high a ¼ λ line corresponding to the line 24 of FIG. 2 is not required. The hybrid coil 25 as shown in FIG. 2 or FIG. 3 may be replaced by any splitter device providing in-phase or anti-phase output signals.

Figure 4:
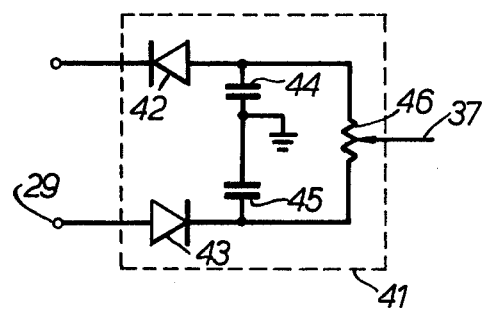
FIG. 4 is a block schematic diagram of a part of the transmitter/receiver shown in FIG. 2 or FIG. 3.

Although any suitable subtraction circuit may be used for the subtraction function performed by circuits 32 and 33, one circuit which includes the associated rectifiers is shown in FIG. 4.

Referring now to FIG. 4, a circuit is shown which may be substituted for the subtractor/rectifier arrangements 32, 30, 34 or 33, 31, 35 of which the latter arrangement is enclosed by broken line 41.

The circuit comprises two diodes 42, 43, and two capacitors 44, 45 shunted by a potentiometer 46.

When the circuit is used to replace the arrangement shown within the broken line 41, signals from port 29 of the coupler 26 are rectified by the diode 43 and signals from the power amplifier are rectified by the diode 42. By adjusting the potentiometer 46 it will be appreciated that AM noise signals can be cancelled as required by operation of the circuit.

If the output of the receiver is connected suitably to the input of the transmitter modulator, then a low level signal arriving at the receiver will be re-broadcast on the same or similar frequency. Therefore such an equipment could be used to boost the signal level in low strength areas and function as a radio relay unit.

By using a CCD receiver the "press to talk" key necessary for single frequency simplex communication is eliminated; the provision of duplex communication system using a single channel instead of two channels is facilitated; and thus only about half of the hardware and half of the band space are needed compared with present systems.

What we claim is:

1. A communication transmitter/receiver for contemporaneous transmission and reception, the transmitter/receiver comprising:

an oscillator capable of being angle modulated, said oscillator providing an output signal for transmission;

aerial means for transmitting said oscillator output signal and for accepting a received signal;

first mixing means for mixing said transmission signal from said oscillator with said received signal, said first mixing means having a first input terminal for receiving said transmission signal and a second input terminal for receiving said received signal;

second mixing means for mixing said transmission signal from said oscillator with said received signal, said second mixing means having a third input terminal for receiving said transmission signal and a fourth input terminal for receiving said received signal;

phase quadrature means arranged so that the signal received at one of said input terminals of said first mixing means is in phase quadrature with the corresponding signal fed to said second mixing means; and means, directly receiving the output signals from said first and second mixing means, for demodulating said received signal.

2. A transmitter/receiver as claimed in claim 1, further comprising first and second low pass filters, said first mixer being arranged to feed said demodulator means via said first low pass filter, and said second mixer being arranged to feed said demodulator means via said second low pass filter.

3. A transmitter/receiver as claimed in claim 2, wherein said aerial means comprises two aerials, one for transmission of said output signal from said oscillator, and one for reception which is arranged to feed the mixers.

4. A transmitter/receiver as claimed in claim 3, further comprising a 90° hybrid coupler, said aerial for reception being arranged to feed said mixers via said 90° hybrid coupler.

5. A transmitter/receiver as claimed in claim 2, wherein said aerial means comprises a transmitter/receiver aerial.

6. A transmitter/receiver as claimed in claim 5, further comprising a non-reciprocal junction device coupled to said transmitter/receiver aerial to feed said received signal to said mixers via said phase quadrature means, and to receive for transmission, said output signal from said oscillator.

7. A transmitter/receiver as claimed in claim 6, further comprising an aerial tuning unit coupling said transmitter/receiver aerial to said non-reciprocal junction device.

8. A transmitter/receiver as claimed in claim 7, further comprising a power amplifier coupling said oscillator to said non-reciprocal junction device.

9. A transmitter/receiver as claimed in claim 8, further comprising detector means, connected to the output terminal of said non-reciprocal junction device which feeds said mixers, for providing a feedback signal to control the gain of said power amplifier.

10. A tranmitter/receiver as claimed in claim 5, further comprising means for rectifying the output signal of said oscillator, and a pair of subtraction circuits fed one from each mixer and from said rectifier means, said subtraction circuits being arranged to feed said demodulator with signals from which oscillator noise has been subtracted.

11. A transmitter/receiver as claimed in claim 10, further comprising a transmission line and a signal splitter, said transmitter/receiver aerial being coupled via said phase quadrature means to feed said mixters in quadrature, said mixers being fed from said oscillator in phase via said transmission line and said signal splitter.

12. A transmitter/receiver as claimed in claim 11, wherein said signal splitter is a hybrid coil, the center tap of which is fed from said transmission line.

13. A transmitter/receiver as claimed in claim 12, further comprising: a controlled attenuator responsive to a control signal; a power amplifier fed from said oscillator via said controlled attenuator; a comparator; and a rectifier via which a signal from said power amplifier is fed to said comparator which is fed also with a reference signal so as to provide said feedback control signal to said controlled attenuator, the amplitude of the signal fed to said power amplifier being controlled by said attenuator so that any difference between the amplitude of the signals fed to said comparator is nullified.

14. A transmitter/receiver as claimed in claim 10, further comprising a signal splitter, said transmitter/receiver aerial being coupled to said mixers via said signal splitter, said oscillator being arranged to feed said mixers in phase quadrature via said phase quadrature means.

15. A transmitter/receiver as claimed in claim 14, wherein said phase quadrature means is a 90° hybrid coupler and said signal splitter is a hybrid coil.

16. A transmitter/receiver as claimed in claim 15, further comprising: a controlled attenuator responsive to a control signal; a power amplifier fed from said oscillator via said controlled attenuator; a comparator; and a rectifier via which a signal from said power amplifier is fed to said comparator which is fed also with a reference signal so as to provide said feedback control signal to said controlled attenuator, the amplitude of the signal fed to said power amplifier being controlled by said attenuator so that any difference between the amplitude of the signals fed to said comparator is nullified.

17. A transmitter/receiver as claimed in claim 2, further comprising a feedback path, provided between the output of said demodulator means and the modulation input of said oscillator for causing said oscillator to be modulated by said received signal, so as to provide a radio relay function.

* * * * *

UNITED STATES PATENT AND TRADEMARK OFFICE
CERTIFICATE OF CORRECTION

PATENT NO. : 4,134,068
DATED : January 9, 1979
INVENTOR(S) : Christopher Keith RICHARDSON It is certified that error appears in the above-identified patent and that said Letters Patent are hereby corrected as shown below:

Column 8, line 3, delete "directly"

Signed and Sealed this

Twenty-fourth Day of July 1979

[SEAL]

Attest:

LUTRELLE F. PARKER
Attesting Officer        Acting Commissioner of Patents and Trademarks

UNITED STATES PATENT AND TRADEMARK OFFICE
CERTIFICATE OF CORRECTION

PATENT NO. : 4,134,068
DATED : January 9, 1979
INVENTOR(S) : Christopher Keith RICHARDSON It is certified that error appears in the above-identified patent and that said Letters Patent are hereby corrected as shown below:

IN THE DRAWINGS:

In Figure 1 and in the drawing of the Abstract, delete "AE" and insert -- AF --.

IN THE SPECIFICATION:

Column 1, line 30, after "received", insert -- signals --.

Column 4, line 21, change "VF.M." to read -- F.M. --.

Signed and Sealed this

Thirteenth Day of November 1979

[SEAL]

Attest:

RUTH C. MASON
Attesting Officer

LUTRELLE F. PARKER
Acting Commissioner of Patents and Trademarks